United States Patent
Ide et al.

(10) Patent No.: US 10,265,860 B2
(45) Date of Patent: Apr. 23, 2019

(54) METHOD AND APPARATUS FOR CONTROLLING OPERATIONS OF ROBOT

(71) Applicant: DENSO WAVE INCORPORATED, Chita-gun, Aichi-pref. (JP)

(72) Inventors: Satoshi Ide, Chita (JP); Daisuke Kawase, Konan (JP); Naoya Kagawa, Kariya (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 14/833,541

(22) Filed: Aug. 24, 2015

(65) Prior Publication Data
US 2016/0052141 A1   Feb. 25, 2016

(30) Foreign Application Priority Data
Aug. 22, 2014 (JP) .................................. 2014-169893

(51) Int. Cl.
   *B25J 13/08* (2006.01)
   *B25J 9/16* (2006.01)

(52) U.S. Cl.
   CPC ........... *B25J 13/088* (2013.01); *B25J 9/1628* (2013.01); *Y10S 901/02* (2013.01); *Y10S 901/46* (2013.01)

(58) Field of Classification Search
   CPC ...... B25J 13/088; B25J 9/1628; B25J 9/1651; G05B 2219/39247; G05B 2219/39263; G05B 2219/40598; G05B 2219/40454; Y10S 901/02; Y10S 901/20; Y10S 901/46
   See application file for complete search history.

(56) References Cited

U.S. PATENT DOCUMENTS

2008/0309273 A1\* 12/2008 Kamiya ................. B25J 9/1674
                                                          318/563
2013/0338827 A1   12/2013 One et al.

FOREIGN PATENT DOCUMENTS

| JP | S635404 A | 1/1988 |
| JP | 3994487 B2 | 10/2007 |
| JP | 2010-167515 A | 8/2010 |

\* cited by examiner

*Primary Examiner* — Spencer D Patton
(74) *Attorney, Agent, or Firm* — Oliff PLC (57) ABSTRACT

A robot, such an industrial robot, has an arm. The arm has a plurality of rotation members, a plurality of joints each rotatably and mutually connecting adjacent two rotation members, and a plurality of electric servo motors respectively driving the joints. In this robot, every operation cycle, an angular speed is calculated at which to drive each servo motor, and a speed of a monitoring portion set in each rotation member is calculated. It is then determined whether or not the speed at the monitoring portion is equal to or lower than a reference speed. When it is determined that the speed at the monitoring portion is over the reference speed, the angular speed of each servo motor is instructed to reduce such that the speed at each monitoring portion becomes the reference speed or lower. The servo motors are driven at the angular speed that has been reduced.

17 Claims, 6 Drawing Sheets

METHOD AND APPARATUS FOR CONTROLLING OPERATIONS OF ROBOT

CROSS-REFERENCE TO RELATED APPLICATION

This application is based on and claims the benefit of priority from earlier Japanese Patent Application No 2014-169893 filed Aug. 22, 2014, the description of which is incorporated herein by reference.

BACKGROUND OF THE INVENTION

Technical Field

The present invention relates to a method and an apparatus for controlling the operations of a robot, and in particular, to the method and the apparatus for controlling the operations of an industrial robot.

Related Art

Conventionally, a technique is known in which, when the movement speed at a control point of a robot exceeds a reference speed during manual operation of the robot, the robot is operated such that an operation target position is corrected to set the movement speed to the reference speed or lower (see Japanese Patent No. 3994487).

However, even when the movement speed of the tip portion of an arm set as the control point of the robot is controlled to the reference speed or lower, the movement speed of the arm may not be sufficiently suppressed. The inventors of the present application have focused on this issue.

SUMMARY

Thus it is desired to provide an apparatus and a method for controlling a robot that enables sufficient suppression of the movement speed of an arm.

One aspect of the disclosure is an apparatus for controlling a robot that has an arm that includes a plurality of rotation members, a plurality of joints each rotatably and mutually connecting adjacent two rotation members of the rotation members, and a plurality of electric servo motors respectively driving the joints to rotate the rotation members. The apparatus comprises angular speed calculating means for calculating, every operation cycle, an angular speed at which to drive each of the servo motors; speed calculating means for calculating a speed of a monitoring portion set in each of the rotation members; determining means for determining whether or not the speed at the monitoring portion, which is calculated by the speed calculating means, is equal to or lower than a reference speed; angular speed reducing means for instructing the angular speed of each of the servo motors to reduce such that the speed at each of the monitoring portions, which is calculated by the speed calculating means, becomes the reference speed or less than the reference speed when it is determined by the determining means that the speed at the monitoring portion is over the reference speed; and driving means for driving the servo motors at the angular speed that has been reduced by the angular speed reducing means.

In the above-described configuration, the arm of the robot includes a plurality of rotation members. The rotation members are rotatably connected to each other by a joint. The angular speed at which to drive each servo motor at each operation cycle is calculated. Each rotation member is driven by each servo motor being driven at the angular speed.

Here, even when the movement speed of the tip end portion of the arm set as the control point of the robot is controlled to the reference speed or lower, the movement speed of a portion of the arm other than the control point may be higher than the reference speed depending on the posture of the arm (robot). The inventors of the present application have focused on this issue.

In this regard, the speed of the monitoring portion set in each rotation member is calculated. The angular speed of each servo motor is then reduced such that the calculated speed of each monitoring portion becomes the reference speed or lower. For example, sections including a section farthest from the joint that serves as the center of rotation when a rotation member is rotated are set as the monitoring portions of the rotation members. Each servo motor is then driven at the reduced angular speed of each servo motor. As a result, the speed of the monitoring portion set in each rotation member, in addition to the speed at the control point of the robot, can be set to the reference speed or lower. The movement speed of the arm can be sufficiently suppressed.

In an embodiment, an angle calculating means for calculating the angle of each servo motor is provided every operation cycle. The speed calculating means calculates the speed of the monitoring portion set in each rotation member based on the current angle of each servo motor, at each operation cycle, the angle of each servo motor calculated by the angle calculating means, and the size (e.g., a length from an axis line to each monitoring portion) of each rotation member.

In the above-described configuration, the angle of each servo motor is calculated at each operation cycle. The speed of the monitoring portion set in each rotation member can then be calculated based on the current angle of each servo motor, the angle of each servo motor calculated at each operation cycle, and the size of each rotation member.

Specifically, as in another example, the following configuration can be used. That is, the speed calculating means calculates the current position of each monitoring portion based on the current angle of each servo motor and the size of each rotation member. The speed calculating means calculates at each operation cycle the position of each monitoring portion based on the angle of each servo motor calculated at each operation cycle by the angle calculating means and the size of each rotation member. The speed calculating means then calculates the speed by dividing the distance from the current position to the position, which is provided when the current operation cycle elapses, of each monitoring portion, by the operation cycle.

In another example, sections including a section farthest from the joint that serves as the center of rotation when a rotation member is rotated are set as the monitoring portions of the rotation members.

In the above-described configuration, sections including the section farthest from the joint that serves as the center of rotation when a rotation member is rotated are set as the monitoring portions of the rotation members. Therefore, in each rotation member, a section that is very likely to have the highest speed can be set as the monitoring portion. The movement speed of the arm can be sufficiently suppressed.

In another example, the angular speed reducing means reduces the angular speed of each servo motor based on the value of a ratio of a maximum speed and the reference speed. The maximum speed is the highest speed among the speeds of the monitoring portions calculated by the speed calculating means.

In the above-described configuration, the angular speed of each servo motor is reduced based on the value of the ratio of the maximum speed, among the calculated speeds of the monitoring portions, and the reference speed. Therefore, the angular speed of each servo motor can be appropriately reduced such that the speed of the monitoring portion having the highest speed becomes the reference speed or lower. The value of the ratio of the maximum speed and the reference speed is a value obtained by the maximum speed being divided by the reference speed (ratio value=maximum speed/reference speed).

In another example, the angular speed reducing means reduces the angular speed of each servo motor by dividing the angular speed of each servo motor calculated by the angular speed calculating means by the ratio value.

In the above-described configuration, the angular speed of each servo motor is reduced by the calculated angular speed of each servo motor being divided by the ratio value. Therefore, the angular speed of each servo motor can be easily and appropriately reduced.

In another example, a virtual angle calculating means and a virtual speed calculating means are provided. The virtual angle calculating means calculates a virtual angle of each servo motor every virtual operation cycle. The virtual speed calculating means calculates a virtual speed of the monitoring portion set in each rotation member based on the current angle of each servo motor, the virtual angle of each servo motor calculated every virtual operation cycle by the virtual angle calculating means, and the size of each rotation member. When the maximum speed, among the virtual speeds of the monitoring portions calculated by the virtual speed calculating means, is higher than the reference speed, the angular speed reducing means shortens the virtual operation cycle by dividing the virtual operation cycle by the ratio value. When the maximum speed is lower than a determination speed, the angular speed calculates the angular speed of each servo motor such that each servo motor is driven, at operation cycle; to the virtual angle of each servo motor calculated by the virtual angle calculating means.

In the above-described configuration, the virtual angle of each servo motor at each virtual operation cycle is calculated. The virtual speed of the monitoring portion set in each rotation member can be calculated based on the current angle of each servo motor, the calculated virtual angle, which is provided when the current virtual operation cycle elapses, of each servo motor, and the size of each rotation member.

Here, when the maximum speed, among the calculated virtual speeds of the monitoring portions, is higher than the reference speed, the virtual operation cycle is shortened by the virtual operation cycle being divided by the ratio value. Therefore, the virtual angle of each servo monitor is recalculated at the shortened virtual operation cycle. When the maximum speed, among the virtual speeds of the monitoring portions recalculated based on the virtual angles, is lower than the reference speed, the angular speed of each servo motor is calculated such that each servo motor is driven every operation cycle to the virtual angle of each servo motor. Therefore, the angle by which each servo motor is driven every operation cycle becomes small and the angular speed of each servo motor can essentially be reduced. Moreover, as a result of the virtual operation cycle being shortened, the angular speeds of all servo motors can be collectively reduced. When the virtual operation cycle is not shortened from the operation cycle, the angular speed of each servo motor is maintained.

In addition, in a configuration in which an operation target position is corrected, as in the background art, the trajectory may be changed when the operation trajectory is a curve. In this regard, in the configuration in which the virtual operation cycle is shortened as described above, the operation trajectory can be maintained. The determination speed may be the same speed as the reference speed, a speed slightly higher than the reference speed, or the like.

In another example, a driving prohibiting means is provided. When shortening of the virtual operation cycle by the virtual operation cycle being divided by the ratio value is repeatedly performed by the angular speed reducing means more than a predetermined number of times, the driving prohibiting means prohibits driving of each servo motor by the driving means.

The control apparatus of a robot is required to calculate the angular speed of each servo motor and the like, and issue a command during the operation cycle. In this regard, in the above-described configuration, when the shortening of the virtual operation cycle by the virtual operation cycle being divided by the ratio value is performed more than the predetermined number of times, driving of each servo motor is prohibited. Therefore, when the angular speed of each servo motor and the like cannot be calculated during the operation cycle, driving of the servo motors can be prohibited.

In another example, an angle calculating means for calculating the angle of each servo motor every operation cycle is provided. When the maximum speed, among the speeds of the monitoring portions calculated by the speed calculating means, is higher than the reference speed, the angular speed reducing means extends the operation cycle by multiplying the operation cycle by the ratio value. The angular speed reducing means reduces the angular speed of each servo motor such that each servo motor is driven, at the extended operation cycle, to the angle of each servo motor calculated by the angle calculating means.

In the above-described configuration, when the maximum speed, among the calculated speeds of the monitoring portions, is higher than the reference speed, the operation cycle is extended by the operation cycle being multiplied by the ratio value. The angular speed of each servo motor is reduced such that each servo motor is driven, at the extended operation cycle, to the calculated angle of each servo motor. Therefore, as a result of the operation cycle being extended and each servo motor being driven to the calculated angle of each servo motor, the angular speeds of all servo motors can be collectively reduced.

In addition, in the configuration in which the operation target position is corrected, as in the background art, the trajectory may be changed when the operation trajectory is a curve. In this regard, in the configuration in which the operation cycle is extended as described above, the operation trajectory can be maintained.

DETAILED DESCRIPTION OF THE PREFERRED EMBODIMENTS (First Embodiment)

A first embodiment realizing a control apparatus, which is according to the present invention, for a robot will now be described with reference to the drawings. The robot described in the present embodiment is, by way of example, a perpendicular articulated robot which is used in an assembly system in a mechanical assembly plant.

First, an overview of a robot 10, which is provided as a perpendicular articulated robot, will be described with reference to FIG. 1.

Figure 1:
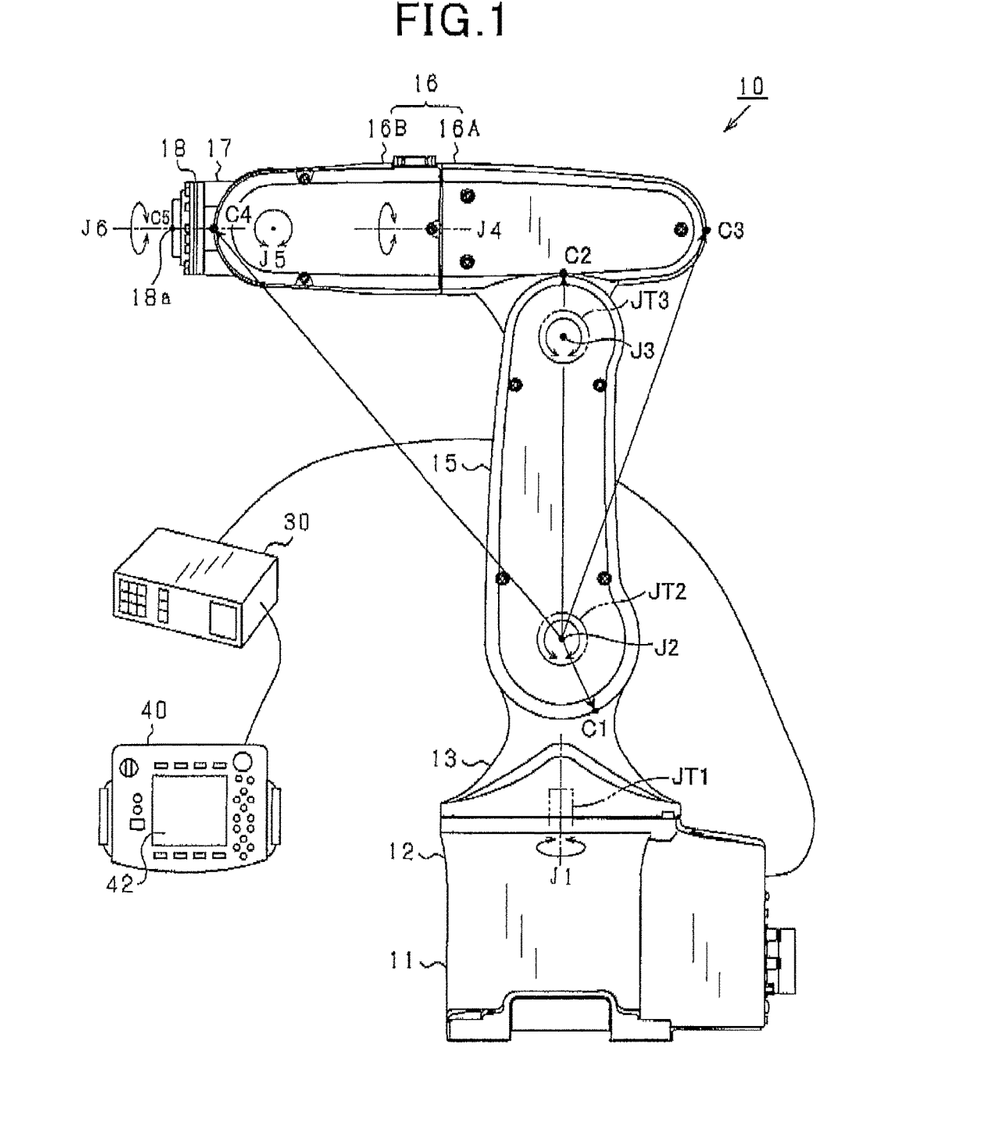
FIG. 1 is a diagram of an overview of a system provided with a robot, a controller, and a teaching pendant, the system including a control apparatus (controller) according to the present invention.

As shown in FIG. 1, the robot 10 is a six-axis robot that has a first axis line J1, a second axis line J2, a third axis line J3, a fourth axis line 34, a fifth axis line J5, and a sixth axis line J6. The first axis line J1 to sixth axis line J6 serve as the center-of-rotation axis lines of respective joints that connect rotation members (or arm members) to each another. Reference numbers JT1, JT2 and JT3 in FIG. 1 conceptually show joints respectively providing the first, second and third axis lines J1, J2 and J3. This is true of the fourth, fifth, and sixth axis lines J4, J5 and J6, though not shown.

The operating angle of each portion of the axis lines is adjusted through driving by a drive source and deceleration by a decelerator or the like. The drive source is composed of an electric servo motor or the like. The servo motors are each capable of rotating in both forward and reverse directions. Each rotation member is operated (driven) with reference to a point-of-origin position by the driving of the servo motor. Each servo motor is provided with an electromagnetic brake and an encoder. The electromagnetic brake brakes the output axis of the servo motor. The encoder outputs a pulse signal based on the rotation angle of the output axis.

The robot 10 is set on the floor. The first axis line J1 extends in a vertical direction. A base 11 of the robot 10 has a fixed portion 12 that is fixed to the floor or the like. The base 11 also has a rotation base 13 (a first rotation member or a first arm member) that is provided above the fixed portion 12. The rotation base 13 is capable of rotating in the horizontal direction with the first axis line J1 as the center of rotation. In other words, the rotation base 13 extends in the direction of the first axis line J1 and is supported by the fixed portion 12 such as to be capable of rotating around the first axis line J1.

A lower arm 15 (a second rotation member or a second arm member) is connected such as to be capable of rotating in the clockwise or counter-clockwise direction with the second axis linen as the center of rotation. The second axis line J2 extends in the horizontal direction. In other words, the lower arm 15 extends in the direction away from the second axis line J2 that is included on a plane perpendicular to the first axis line J1. In addition, the lower arm 15 is supported by the rotation base 13 such as to be capable of rotating around the second axis line J2. The lower arm 15 extends in the vertical direction in a basic posture.

An upper arm 16 is connected to the upper end portion of the lower arm 15. The upper arm 16 is capable of rotating in the clockwise or counter-clockwise direction with the third axis line J3 as the center of rotation. The third axis line J3 extends in the horizontal direction. In other words, the upper arm 16 extends in the direction away from the third axis line J3 that is parallel to the second axis line J2. In addition, the upper arm 16 is supported by the lower arm 15 such as to be capable of rotating around the third axis line J3. The upper arm 16 extends in the horizontal direction in a basic posture.

The upper arm 16 is configured to be separated into two arm portions on the base end side (on the side of the joint that rotates around the third axis line J3 during rotation) and the tip end side. The arm portion on the base end side is a first upper arm 16A (a third rotation member or a third arm member). The arm portion on the tip end side is a second upper arm 163 (a fourth rotation member or a fourth arm member). The second upper arm 16B is capable of rotating in a twisting direction in relation to the first upper arm 16A, with the fourth axis line J4 as the center of rotation. The fourth axis line J4 extends in the longitudinal direction of the first upper arm 16A. In other words, the second upper arm 16B extends in the direction of the fourth axis line J4 that is included on a plane perpendicular to the third axis line J3. In addition, the second upper arm 16B is supported by the first upper arm 16A such as to be capable of rotating around the fourth axis line J4.

A wrist portion 17 (a fifth rotation member or a fifth arm member) is provided in the tip end portion of the upper arm 16 (specifically, the second upper arm 16B). The wrist portion 17 is capable of rotating in relation to the second upper arm 16B with the fifth axis line J5 as the center of rotation. The fifth axis line J5 extends in the horizontal direction. In other words, the wrist portion 17 extends in a direction away from the fifth axis line J5 that is perpendicular to the fourth axis line J4. In addition, the wrist portion 17 is supported by the second upper arm 16B such as to be capable of rotating around the fifth axis line J5.

A hand portion 18 (a sixth rotation member or a sixth arm member) for attaching a work piece, a tool, or the like is provided in the tip end portion of the wrist portion 17. The hand portion 18 is capable of rotating in a twisting direction with the sixth axis line J6 as the center of rotation. The sixth axis line 16 is the center line of the hand portion 18. In other words, the hand portion 18 extends in the direction of the sixth axis line J6 that is perpendicular to the fifth axis line J5. In addition, the hand portion 18 is supported by the wrist portion 17 such as to be capable of rotating around the sixth axis line J6. As described above, the arm of the robot 10 is composed of the rotation base 13, the lower arm 15, the upper arm 16, the wrist portion 17, and the hand portion 18.

A controller (control apparatus) 30 includes a central processing unit (CPU), a read-only memory (ROM), a random access memory (RAM), a drive circuit, a position detection circuit, and the like. The ROM stores therein a system program, an operating program, and the like of the robot 10. The RAM stores therein parameter values and the like when the programs in the ROM are run. The position detection circuit receives input of detection signals from each encoder. The position detection circuit detects the rotation angle of the servo motor provided in each joint JT1 (JT2, JT3, . . . ) based on the detection signal from each encoder. The CPU runs the operating program (program) set in advance. As a result, the CPU performs feedback control to control the rotation angle (arm posture) of each joint in the arm of the robot 10 to a target rotation angle (target posture) based on position information inputted from the position detection circuit. According to the present embodiment, the controller 30 performs speed suppression control to suppress the movement speed of the arm of the robot 10 to a reference speed or lower during teaching (manual operation) of the robot 10. The reference speed is prescribed as, for example, 250 mm/s based on standards such as Japanese Industrial Standards (JIS) or International Organization for Standardization (ISO) standards.

A teaching pendant 40 (operating unit) includes a microcomputer that has a CPU, a ROM, and a RAM. The teaching pendant 40 also includes various manual operating keys, a display 42, and the like. The pendant 40 is connected to and is capable of communicating with the controller 30. An operator (user) can create, correct, and register operating programs for the robot 10, as well as set various parameters, by manually operating the pendant 40. In teaching that is performed to correct an operating program and the like, the operator gives an instruction on an instruction point (position coordinates) through which a center point 18*a* (control point) of the hand portion 18 of the arm passes during operation. The operator can then operate the robot 10 based on the taught operating program via the controller 30. In other words, the controller 30 controls operation of the arm of the robot 10 based on the operating program set in advance and the operation of the pendant 40.

Here, the inventors of the present application have focused on the following issue. During teaching (manual operation) of the robot 10, even when the movement speed of the hand portion 18 (particularly the center point 18*a*) of the arm is controlled to the reference speed or lower, the movement speed of a portion of the arm other than the hand portion 18 may be higher than the reference speed depending on the in-operation posture of the robot 10. For example, when the robot 10 is in the posture shown in FIG. 2 and the rotation base 13 is rotated, the movement speed of the center point 18*a* (point C5) of the hand portion 18 is sufficiently lower than the reference speed. However, the movement speeds of the tip portion (point C2) of the lower arm 15 and one end portion (point C3) of the upper arm 16 may be higher than the reference speed.

Figure 2:
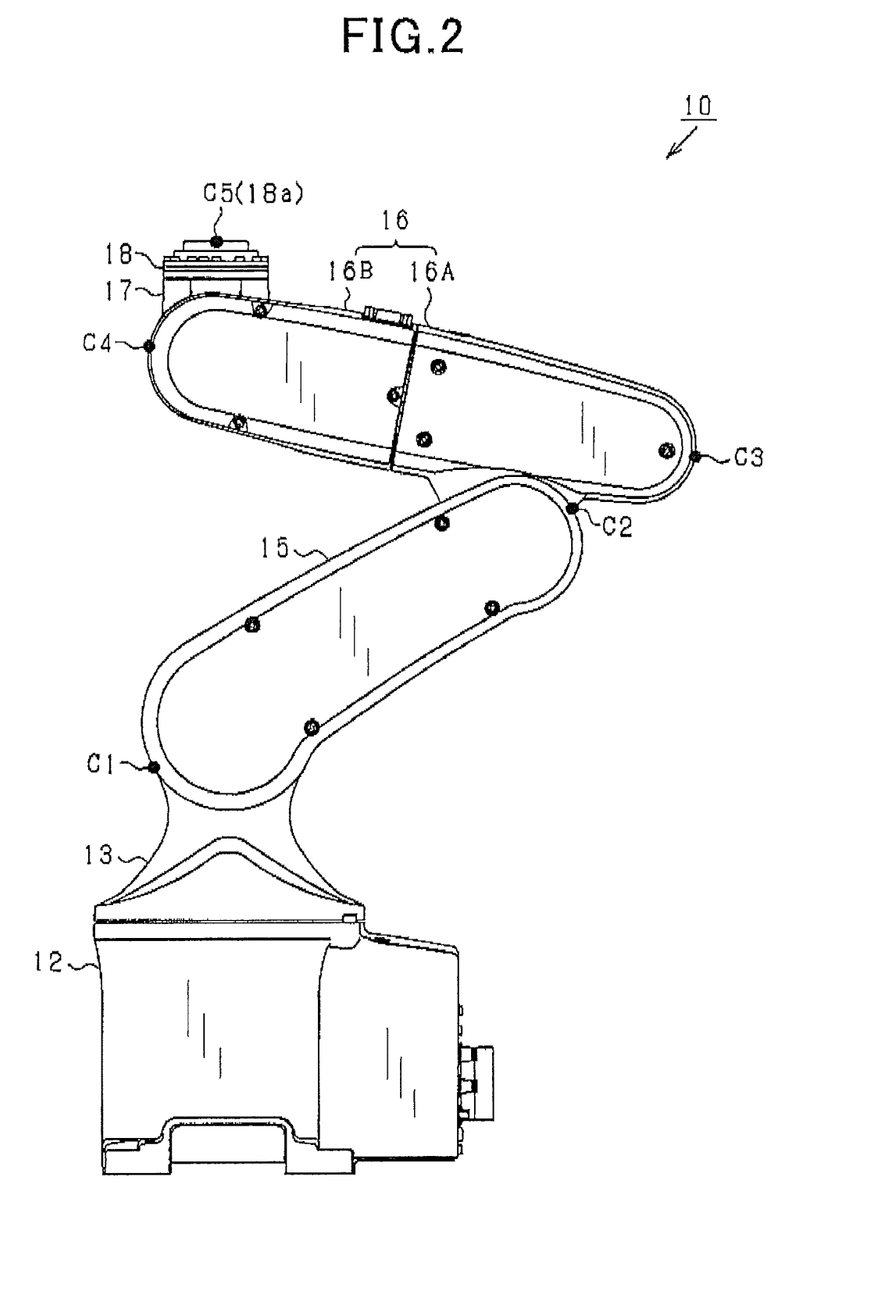
FIG. 2 is a front view of a specific posture of the robot.

In the present embodiment, with consideration the foregoing, monitoring portions (points) C1 to C5, which are point-like regions, are set or designated on the second to sixth rotation members. When the robot is operating, the monitoring portions C1 to C5 are used to monitor the rotation speeds thereat, and the speed monitoring information is reflected in producing paths of the arm members. The monitoring portions can be defined as points (or point-like regions) at both ends of a rotation member (i.e., each arm member) rotated by a designated joint which has been driven for rotation.

Based on this definition, when the second axis line J2 (i.e., the second joint JT2) is driven for rotation, two monitoring portions C1 and C2 can be set at both ends of the lower arm 15 in its longitudinal direction (refer to FIG. 2). Of these monitoring portions C1 and C2, one monitoring portion C1 is closer in position to the second axis line J2 than that of the other monitoring portion C2 to the second axis line J2. That is, the other monitoring portion C2 is the farthest from the second axis line J2. Similarly when the third axis line (i.e., the joint JT3) is driven for rotation, two monitoring portions C3 and C4 are set at both end points of the upper arm 16 in the longitudinal direction thereof (refer to FIG. 2). When the third axis linen is rotated, the lower arm 15 itself is not concerned with the rotation of the third axis line J3, the foregoing monitoring portions C1 and C2 are not required to be included in controlling monitoring the speeds of the upper arm 16, i.e., in driving the joint JT3.

When another component (an end effector) is attached to a rotation member, such as the upper arm 16, a monitoring portion C5 may be set on the tip end portion or the like of the attached component. In the present embodiment, the monitoring portion C5 is set as shown in FIG. 2.

Described above, in the present embodiment, except for the rotation base 13 serving as the first rotation member, the monitoring portions C1 to C5 are set on the lower arm 15 serving as the second rotation member, the upper arm 16 serving as the third and fourth rotation members, the wrist portion 17 serving as the fifth rotation member, and the hand portion 18 serving as the sixth rotation member. Among these monitoring portions C1 to C5, the lowest monitoring portion C1 will not provide a maximum rotation speed during operation of the robot, so that the monitoring portion C12 may be omitted from the portions being monitored. Meanwhile, depending on types of robots and various postures taken by the robot, longitudinal ends of arms which are necessary to rotate at a maximum speed or higher speeds change largely, it is preferred to take such arm movements into consideration. Thus it is preferred to monitor rotation speeds at, at least, the three monitoring portions C2 to C4 described.

How to set the positions of the monitoring portions is not limited to the foregoing technique, but any technique can be adopted, as long as it is understood that arm rotation speeds always change during the operation of a robot, depending robot types and arm postures and arm portions rotated at a maximum speed or higher speeds can be monitored. That is, the foregoing definition of setting the monitoring portions is inherent to the present embodiment. An operator can set such monitoring portions at desired arm points and a computer simulation can be used for such setting.

In the present embodiment, the angular speed of each servo motor is suppressed such that the movement speeds of all the monitoring portions C1 to C5 are maintained to be equal to or below the predetermined reference speed.

Figure 3:
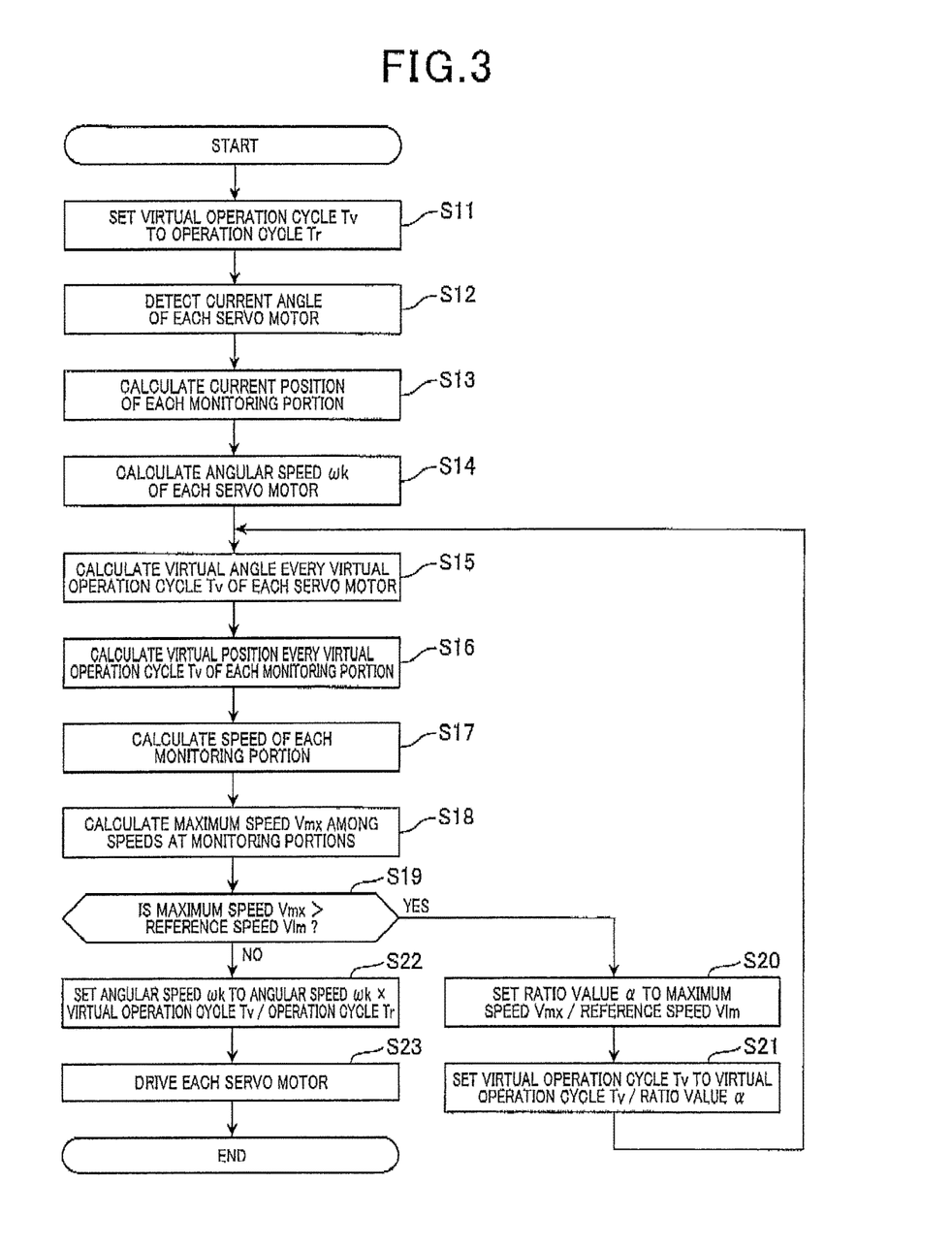
FIG. 3 is a flowchart of a process for speed suppression control of an arm according to the first embodiment.

FIG. 3 is a flowchart of a process for speed suppression control to suppress the movement speed of the arm of the robot 10 to the reference speed or lower. This series of processes is repeatedly performed by the controller 30 at an operation cycle Tr (i.e., at intervals of Tr) over which the arm is operated. The operation cycle Tr is, for example, 8 ms. Although the present embodiment is described such that this process is performed during teaching (i.e., manual operations for the robot), the process can be applied to an actual operation of the robot at a job site.

First, the controller 30 sets a virtual operation cycle Tv to the operation cycle Tr (S11). In other words, the controller 30 sets the operation cycle Tr as an initial value of the virtual operation cycle Tv. In the present embodiment, the virtual operation cycle Tv can be referred to as an operation cycle used to produce the path of each of the arm members of the robot. When the speed reducing process is not performed, a relationship of the virtual operation cycle Tv=the actual operation cycle Tr (i.e., actual control cycle) is realized.

Next, the controller 30 detects a current angle θk of each servo motor (S12). Specifically, the controller 30 makes the position detection circuit detect the current angle θk of each servo motor based on the detection signal from the encoder provided in each servo motor. k denotes a number from 1 to 6 respectively corresponding to the first axis line J1 to sixth axis line J6.

Next, the controller 30 calculates a current position Pi of each monitoring portion (S13). The controller 30 calculates the current position Pi of each monitor portion based on the current angle θk of each servo motor and the size of each rotation member. The index i denotes a number from 1 to 5 respectively corresponding to points C1 to C5. The size of each rotation member is for example expressed by a length (or a distance) from the axis line of a joint to a monitoring portion. Specifically, the controller 30 calculates the distance from the center of rotation of each rotation member to the monitoring portion based on the size of each rotation member and the position at which each monitoring portion is set. Then, the controller 30 calculates the position of each point C1 to C5 by combining the current angle θk of each servo motor and the size of each rotation member.

Figure 4:
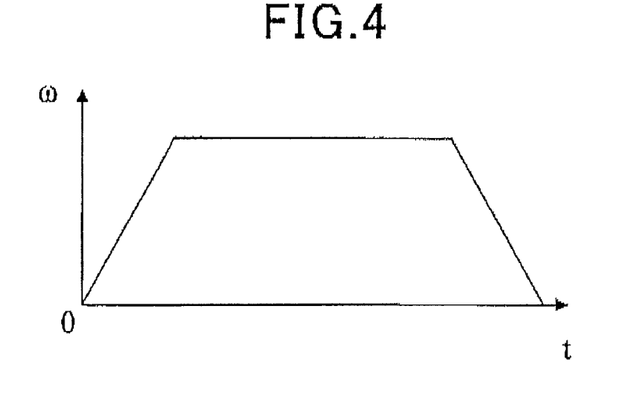
FIG. 4 is a graph of an angular speed pattern of a servo motor.

Next, the controller 30 calculates an angular speed ωk of each servo motor (S14). Specifically, the target angle of each servo motor is calculated based on the instruction point regarding which an instruction has been given as the point through which the center point 18a of the hand portion 18 of the arm passes during teaching. As shown in FIG. 4, for example, the pattern of the angular speed ωk when each servo motor is driven to the target angle is set. The controller 30 calculates the current angular speed ωk of each servo motor based on the pattern of the angular speed ωk that has been set. k denotes a number from 1 to 6 respectively corresponding to the first axis line J1 to sixth axis fine J6.

Next, the controller 30 calculates a virtual angle θvk after the virtual operation cycle Tv of each servo motor (S15). Specifically, the controller 30 calculates the virtual angle θvk using an expression θvk=θk+ωk×Tv.

Next, the controller 30 calculates a virtual position Pvi after the virtual operation cycle Tv of each monitoring portion (S16). Specifically, in a manner similar to the process at S13, the controller 30 calculates the virtual position Pvi after the virtual operation cycle Tv of each monitoring unit based on the virtual angle θvk after the virtual operation cycle Tv of each servo motor and the size of each rotation member.

Next, the controller 30 calculates a speed Vi of each monitoring portion (S17). Specifically, the controller 30 calculates the speed Vi by dividing the distance between the current position Pi and the virtual position Pvi after the virtual operation cycle Tv of each monitoring portion by the operation cycle Tr. i denotes a number from 1 to 5 respectively corresponding to points C1 to C5.

Next, the controller 30 calculates a maximum speed Vmx that is the highest speed Vi among the speeds Vi of the monitoring portions (S18). The controller 30 then whether or not the maximum speed Vmx is higher than a reference speed Vlm (S19). When determined, through the determination, that the maximum speed Vmx is higher than the reference speed Vlm (YES at S19), the controller 30 calculates a value α that is the ratio of the maximum speed Vmx and the reference speed Vlm (S20). In other words, the controller 30 calculates the ratio value α using an expression α=Vmx/Vlm (α>1).

Next, the controller 30 sets a value obtained by dividing the virtual operation cycle Tv by the ratio value α as the new virtual operation cycle Tv (S21). In other words, the controller 30 shortens the virtual operation cycle Tv from the current virtual operation cycle Tv (the initial value being the operation cycle Tr). Then, the controller 30 performs the processes from S15 again using the shortened virtual operation cycle Tv.

Meanwhile, when determined, through the determination at S19, that the maximum speed Vmx is not higher than the reference speed Vlm (NO at S19), the controller 30 calculates the angular speed ωk of each servo motor based on the virtual operation cycle Tv (S22). Specifically, the controller 30 calculates the angular speed ωk using an expression ωk←ωk×Tv/Tr. In other words, the controller 30 calculates the angular speed ωk of each servo motor such that the servo motor is driven to the virtual angle θvk of each servo motor after the operation cycle Tr. When the virtual operation cycle Tv is not shortened from the operation cycle Tr, the angular speed ωk is maintained.

Next, the controller 30 drives each servo motor at the calculated angular speed ωk of each servo motor (S23). The controller 30 then temporarily waits for performance of this series of steps until the next operation cycle (END).

The step at S14 corresponds to a process (angular speed calculating step) as an angular speed calculating means. The step at S15 corresponds to a process as a virtual angle calculating means (angle calculating means). The steps at S13 to S17 correspond to a process (speed calculating step) as a virtual speed calculating means (speed calculating means). The steps S18 and S19 correspond to a determination means (determination step). The steps at S20, S21, and S22 correspond to a process (angular speed reducing step) as an angular speed reducing means. The step at S23 corresponds to a process (driving step) as a driving means.

According to the present embodiment described in detail above, the following advantages are achieved.

The speed Vi of the monitoring portion (points C1 to C5) set in each rotation member is calculated. The angular speed ωk of each servo motor is reduced such that the calculated speed Vi of each monitoring portion becomes the reference speed Vlm or lower. Each servo motor is driven at the reduced angular speed ωk of each servo motor. As a result, the speed Vi of the monitoring portion set in each rotation member, in addition to the speed of at control point of the robot 10, can be set to the reference speed or lower. The movement speed of the arm can be sufficiently suppressed.

The virtual angle θvk (angle θak) of each servo motor after the virtual operation cycle Tv (operation cycle Tr) is calculated. The speed Vi of the monitoring portion set in each rotation member can then be calculated based on the current angle θk of each servo motor, the calculated virtual angle θvk after the virtual operation cycle Tv of each servo motor, and the size of each rotation member. Specifically, the current position Pi of each monitoring portion can be calculated based on the current angle θk of each servo motor and the size of each rotation member. The virtual position Pvi (position Pai) after the virtual operation cycle Tv (operation cycle Tr) of each monitoring portion can be calculated based on the virtual angle θvk after the virtual operation cycle Tr of each servo motor and the size of each rotation member. Then, the speed Vi can be calculated by dividing the distance between the current position Pi and the virtual position Pvi after the virtual operation cycle Tv of each monitoring portion by the operation cycle Tr.

The section farthest from the joint (center-of-rotation axis line) that serves as the center of rotation when each rotation member is rotated is set as the monitoring portion of each rotation member. Therefore, for each rotation member, sections including a section that is very likely to have the highest speed can be set as the monitoring portion. The movement speed of the arm can be sufficiently suppressed.

The angular speed ωk of each servo motor is reduced based on the value α of the ratio of the maximum speed Vmx and the reference speed Vlm, the maximum value Vmx being the highest speed among the calculated speeds Vi of the monitoring portions. Therefore, the angular speed ωk of each servo motor can be appropriately reduced such that the speed Vi of the monitoring portion having the highest speed becomes the reference speed Vlm or lower.

When the maximum speed Vmx among the calculated speeds Vi of the monitoring portions is higher than the reference speed Vlm, the virtual operation cycle Tv is shortened by the virtual operation cycle Tr being divided by the ratio value α. Therefore, the virtual angle θvk after the reduced virtual operation cycle Tv of each servo motor is recalculated. When the maximum speed Vmx, among the speeds Vi of the monitoring portions that have been recalculated based on the virtual angles θvk, is lower than the reference speed Vlm, the angular speed ωk of each servo motor is reduced such that each servo motor is driven to the virtual angle θvk of each servo motor after the operation cycle Tr. Therefore, the angle θak by which each servo motor is driven after the operation cycle Tr becomes smaller and the angular speed ωk of each servo motor can be essentially reduced. Moreover, as a result of reduction of the virtual operation cycle Tv, the angular speed ωk of all servo motors can be collectively reduced.

In a configuration in which an operation target position is corrected, as in the background art, the trajectory may be changed when the operation trajectory is a curve. In this regard, in the configuration in which the virtual operation cycle Tv is shortened as described above, the operation trajectory can be maintained.

(Second Embodiment)

According to the first embodiment, the robot 10 performs a point to point (PTP) operation. However, according to a second embodiment, the robot 10 performs a continuous path (CP) operation. The difference with the first embodiment will mainly be described hereafter.

Figure 5:
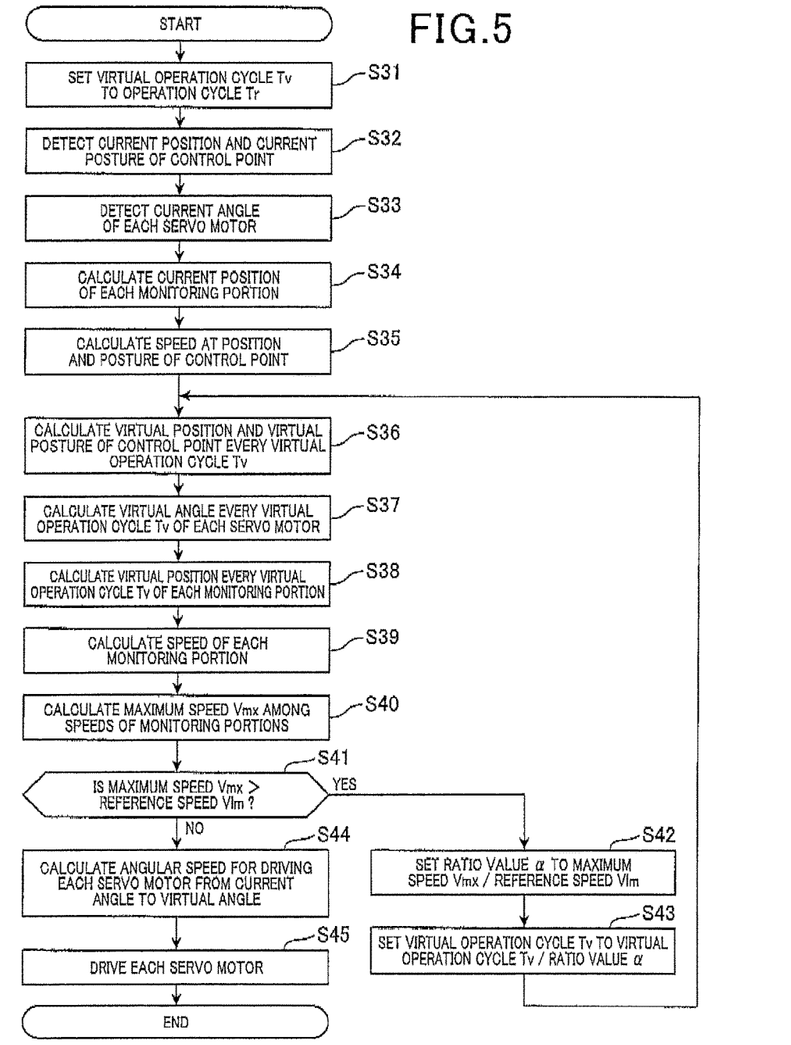
FIG. 5 is a flowchart of a process for speed suppression control of an arm according to a second embodiment.

FIG. 5 is a flowchart of a process for speed suppression control in which the movement speed of the arm of the robot 10 is suppressed to the reference speed or lower. This series of processes is repeatedly performed by the controller 30 at the operation cycle Tr over which the arm is operated.

First, the controller 30 sets the virtual operation cycle Tv to the operation cycle Tr (S31). In other words, the controller 30 sets the operation cycle Tr as the initial value of the virtual operation cycle Tv.

Next, the controller 30 detects the current position and posture PP of the control point (the center point 18a of the hand portion 18) of the arm (S32). In the CP operation in which the control point is moved along the taught trajectory, the current position and posture PP are calculated.

Next, the controller 30 detects the current angle θk of each servo motor (S33). The controller 30 then calculates the current position Pi of each monitoring portion (S34). The processes at S33 and S34 are the same as the processes at S12 and S13 in FIG. 3.

Next, the controller 30 calculates the speed PV at the position and posture of the control point of the arm (S35). Specifically, the controller 30 calculates a target position and a target posture of the control point based on the trajectory of the control point of which an instruction has been given during teaching. Then, the speed PV at the position and the posture of the control point is calculated based on the target position of the control point and the target posture.

Next, the controller 30 calculates the virtual position and posture PPv of the control point after the virtual operation cycle (S36). Specifically, the controller 30 calculates the virtual position and posture PPv using an expression PPv=PP+PV×Tv.

Next, the controller 30 calculates the virtual angle θvk after the virtual operation cycle Tv of each servo motor (S37). Specifically, the controller 30 calculates the virtual angle θvk after the virtual operation cycle Tv of each servo motor based on the virtual position and posture PPv of the control point after the virtual operation cycle Tv.

Next, the controller 30 calculates the virtual position after the virtual operation cycle Tv of each monitoring portion (S38) and calculates the speed Vi of each monitor portion (S39). The controller 30 then calculates the maximum speed Vmx that is the highest speed Vi among the speeds Vi of the monitoring portions (S40). The controller 30 determines whether or not the maximum speed Vmx is higher than the reference speed Vlm (S41). The processes at S38 to S41 are the same as the processes at S16 to S19 in FIG. 3.

When determined, through the determination at S41, that the maximum speed Vmx is higher than the reference speed Vlm (YES at S41), the controller 30 calculates the value α of the ratio of the maximum speed Vmx and the reference speed Vlm (S42). The controller 30 sets the value obtained by dividing the virtual operation cycle Tv by the ratio value α as the new virtual operation cycle Tv (S43). The processes at S42 and S43 are the same as the processes at S20 and S21 in FIG. 3. The controller 30 then performs the process from S36 again using the shortened virtual operation cycle Tv.

Meanwhile, when determined, through the determination at S41, that the maximum speed Vmx is not higher than the reference speed Vlm (NO at S41), the controller 30 calculates the angular speed ωk at which each servo motor is driven from the current angle θk to the virtual angle θvk (S44). Specifically, the controller 30 calculates the angular speed ωk using an expression ωk←(θvk−θk)/Tr. In other words, the controller 30 calculates the angular speed ωk of each servo motor such that each servo motor is driven to the virtual angle θvk of each servo motor after the operation cycle Tr.

Next, the controller 30 drives each servo motor at the angular speed ωk of each servo motor that has been calculated. The controller 30 then temporarily ends this series of steps until the next operation cycle (END).

The process at S37 corresponds to a process as a virtual angle calculating means (angle calculating means). The processes at S34 to S39 correspond to a process (speed calculating step) as a virtual speed calculating means (speed calculating means). The processes at S42, S43, and S44 correspond to a process (angular speed reducing step) as an angular speed reducing means. The process at S45 corresponds to a process (driving step) as a driving means.

According to the present embodiment described in detail above, the following advantages are achieved. Here, only advantages differing from those according to the first embodiment are described.

The virtual angle θvk (angle θak) after the virtual operation cycle Tv of each servo motor can be calculated based on the virtual position and posture PPv of the control point after the virtual operation cycle Tv (operation cycle Tr).

When the maximum speed Vmx, among the calculated speeds Vi of the monitoring portions, is higher than the reference speed Vlm, the virtual operation cycle Tv is shortened the virtual operation cycle Tv being divided by the ratio value α. Therefore, the virtual position and posture PPv of the control point can be recalculated using the shortened virtual operation cycle Tv. As a result, the movement speed of the arm can be sufficiently suppressed regardless of whether PTP operation or CP operation is performed.

The first embodiment and the second embodiment may be carried out with the following modifications.

When shortening of the virtual operation cycle Tv by the virtual operation cycle Tv being divided by the ratio value α (S21 and S43) is repeatedly performed more than a predetermined number of times, the controller 40 (driving prohibiting means) may prohibit driving of each servo motor. The controller 30 (control apparatus) of the robot 10 is required to calculate the angular speed ωk and the like of each servo motor and issue a command during the operation cycle Tr. In this respect, in the above-described configurations, when the controller 30 is unable to calculate the angular speed ωk and the like of each servo motor during the operation cycle Tr, driving of the servo motors can be prohibited. For example, the predetermined number of times, mentioned above, may be set to about five times.

At S19 in FIG. 3 and S41 in FIG. 5, whether or not the maximum speed Vmx is higher than the reference speed Vlm is determined. However, whether or not the maximum speed Vmx is higher than a determination speed set slightly higher than the reference speed Vlm may be determined. In this case, speed suppression control of the arm can be quickly completed.

At S21 in FIG. 3 and S43 in FIG. 5, the virtual operation cycle Tv is shortened by the virtual operation cycle Tv being divided by the ratio value α. However, the virtual operation cycle Tr may be shortened by the virtual operation cycle Tr being divided by a value slightly higher than the ratio value α. In this case as well, speed suppression control of the arm can be quickly completed.

250 mm/s, which is prescribed by standards such as JIS or ISO, is used as the reference speed Vlm. However, a speed that is slightly lower, such as 230 mm/s, may be used as the reference speed Vlm. In this case, the movement speed of the arm cam be more easily and more reliably reduced to below 250 mm/s.

(Third Embodiment)

According to the first embodiment and the second embodiment, the angular speed ωk of each servo motor is reduced by the virtual operation cycle Tv being shortened. However, according to a third embodiment, the angular speed ωk of each servo motor is reduced by the operation cycle Tr being extended. The difference with the first embodiment will mainly be described hereafter.

Figure 6:
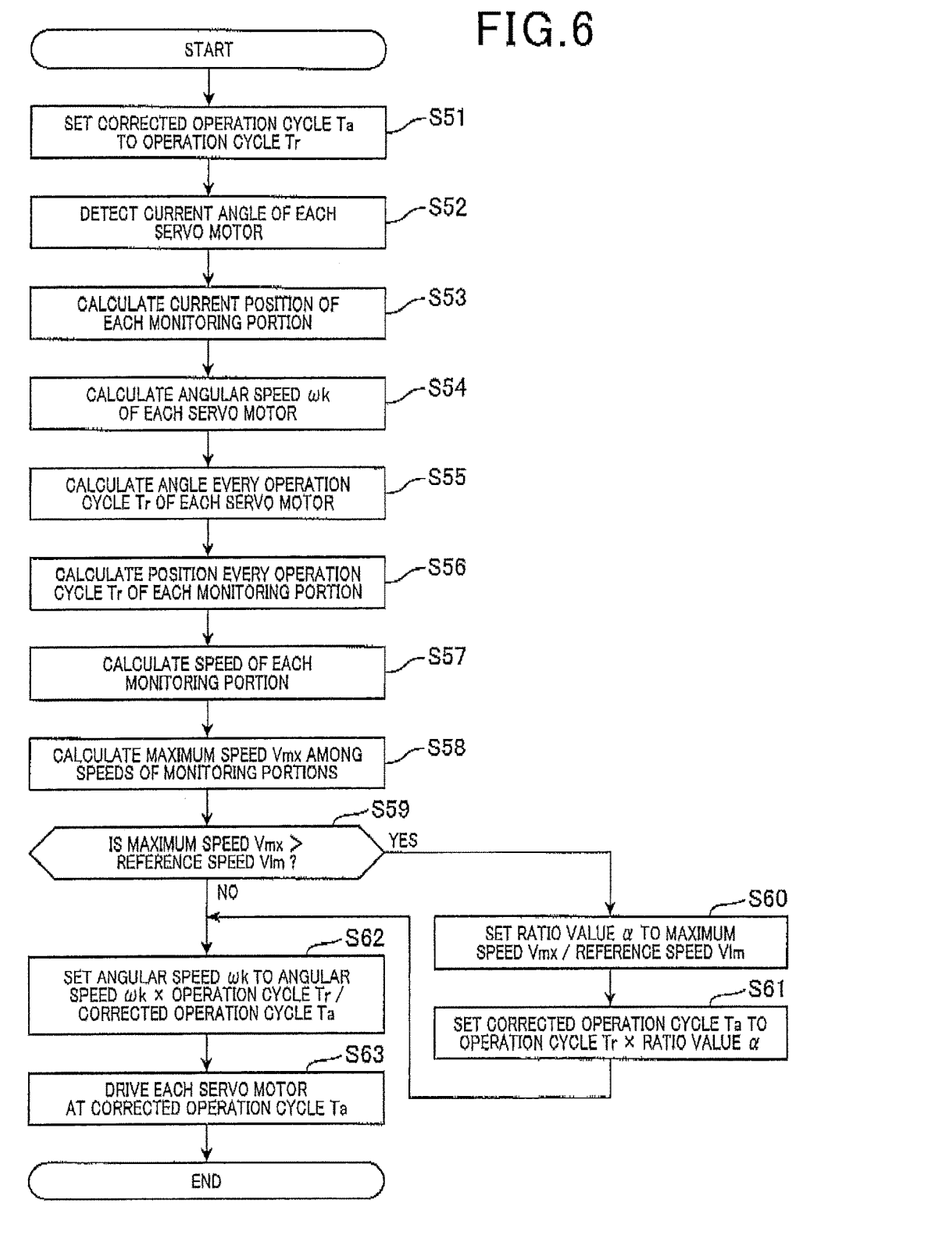
FIG. 6 is a flowchart of a process for speed suppression control of an arm according to a third embodiment.

FIG. 6 is a flowchart of the process for speed suppression control in which the movement speed of the arm of the robot 10 is suppressed to the reference speed or lower. This series of processes is repeatedly performed by the controller 30 at the operation cycle Tr over which the arm is operated. According to the present embodiment, the operation cycle Tr is variable.

First, the controller 30 sets a corrected operation cycle Ta to the operation cycle Tr (S51). In other words, the controller 30 sets the operation cycle Tr before correction as the initial value of the corrected operation cycle Ta.

Next, the controller 30 detects the current angle θk of each servo motor (52) and calculates the current position Pi of each monitoring portion (S53). The controller 30 then calculates the angular speed ωk of each servo motor (S54). The processes at S52 to S54 are the same as the processes at S12 to S14 in FIG. 3.

Next, the controller 30 calculates the angle θa after the operation cycle Tr of each servo motor (S55). Specifically, the controller 30 calculates the angle θa after the operation cycle Tr using an expression θak=θk+ωk×Tr.

Next, the controller 30 calculates the position Pai after the operation cycle Tr of each monitoring portion (S56). Specifically, in a manner similar to the process at S13 in FIG. 3, the controller 30 calculates the position Pai after the operation cycle Tr of each monitoring portion based on the angle θak after the operation cycle Tr of each servo motor and the size of each rotation member.

Next, the controller 30 calculates the speed Vi of each monitoring portion (S57). Specifically, the controller 30 calculates the speed Vi by dividing the distance between the current position Pi of each monitoring portion and the position Pai after the operation cycle Tr by the operation cycle Tr.

Next, the controller 30 calculates the maximum speed Vmx that is the highest speed Vi among the speeds Vi of the monitoring portions (S58). The controller 30 determines whether or not the maximum speed Vmx is higher than the reference speed Vlm (359). The processes at S58 and S59 are the same as the processes at S18 and S19 in FIG. 3.

When determined, through the determination at S59, that the maximum speed Vmx is higher than the reference speed Vlm (YES at 359), the controller 30 calculates the value α of the ratio of the maximum speed Vmx and the reference speed Vlm (S60). The controller 30 sets a value obtained by multiplying the operation cycle Tr with the ratio value α as the corrected operation cycle Ta (S61). Then, the controller 30 performs the process at S62 using the corrected operation cycle Ta that is longer than the operation cycle Tr.

Meanwhile, when determined, through the determination at S59, that the maximum speed Vmx is not higher than the reference speed Vlm (NO at S59), the controller 30 performs the process at S62. The controller 30 calculates the angular speed ωk of each servo motor based on the corrected operation cycle Ta (S62). Specifically, the controller 30 calculates the angular speed ωk using an expression ωk←ωk×Tr/Ta. In other words, the controller 30 calculates the angular speed ωk of each servo motor such that each servo motor is driven to the angle θak of each servo motor after the corrected operation cycle Ta. When the corrected operation cycle Ta is not extended from the operation cycle Tr, the angular speed ωk is maintained.

Next, the controller 30 drives each servo motor at the corrected operation cycle Ta at the calculated angular speed ωk of each servo motor (S63). The controller 30 then temporarily ends this series of processes (END).

The process at S54 corresponds to a process (angular speed calculating step) as an angular speed calculating means. The process at S55 corresponds to a process as an angle calculating means. The processes at S53 to S57 correspond to a process (speed calculating step) as a speed calculating means. The processes at S60, S61, and S62 correspond to a process (angular speed reducing step) as an angular speed reducing means. The process at S63 corresponds to a process (driving step) as a driving means.

According to the present embodiment described in detail above, the following advantages are achieved. Here, only advantages differing from those according to the first embodiment are described.

The angle θak of each servo motor after the operation cycle Tr is calculated. Then, the speed Vi of the monitoring portion set in each rotation member can be calculated based on the current angle θk of each servo motor, the calculated angle θak after the operation cycle Tr of each servo motor, and the size of each rotation member. Specifically, the current position Pi of each monitoring portion can be calculated based on the current angle θk of each servo motor and the size of each rotation member. The position Pai after the operation cycle Tr of each monitoring portion can be calculated based on the angle θak after the operation cycle Tr of each servo motor and the size of each rotation member. The speed Vi can be calculated by the distance between the current position Pi of each monitoring portion and the position Pai after the operation cycle Tr being divided by the operation cycle Tr.

When the maximum speed Vmx, among the calculated speeds Vi of the monitoring portions, is higher than the reference speed Vlm, the operation cycle Tr is extended to the corrected operation cycle Ta that is obtained by the operation cycle Tr being multiplied by the ratio value α. Then, the angular speed ωk of each servo motor is reduced such that each servo motor is driven to the calculated angle θak of each servo motor after the corrected operation cycle Ta. Therefore, as a result of the operation cycle being extended and the servo motors being driven to the calculated angle θak of each servo motor that has been calculated, the angular speeds ωk of all servo motors can be collectively reduced.

In essence, because the angular speed ωk of each servo moto is reduced by the calculated angular speed ωk of each servo motor being divided by the ratio value α, the angular speed ωk of each servo motor can be easily and appropriately reduced.

In a configuration in which an operation target position is corrected, as in the background art, the trajectory may be changed when the operation trajectory is a curve. In this regard, in the configuration in which the operation cycle is extended as described above, the operation trajectory can be maintained.

The third embodiment may be carried out with the following modifications.

At S61 in FIG. 6, the operation cycle Tr is extended by the operation cycle Tr being multiplied by the ratio value α. However, the operation cycle Tr may be extended by the operation cycle Tr being multiplied by a value slightly higher than the ratio value α. In addition, 250 mm/s, which is prescribed by standards such as JIS or ISO, is used as the reference speed Vlm. However, a speed that is slightly lower, such as 230 mm/s, may be used as the reference speed Vlm. In these cases, the movement speed of the arm cam be more easily and more reliably reduced to below 250 mm/s.

According to each embodiment, a horizontal articulated robot or the like may be used instead of the vertical articulated robot 10.

What is claimed is:

1. An apparatus for controlling motions of a robot, the apparatus comprising:
a controller equipped with both a processing unit and a memory, the controller being configured to, through execution of the processing unit based on a preset algorithm stored in the memory:
calculate, every operation cycle, an angular speed at which to drive each of a plurality of electric servo motors of the robot, the robot having an arm, the arm including a plurality of rotation members, a plurality of joints each rotatably and mutually connecting two mutually-adjacent rotation members of the rotation members, and the plurality of electric servo motors respectively driving the joints to rotate the rotation members;
calculate a speed of each of monitoring portions previously designated in or on the rotation members, respectively;
calculate a maximum speed among the speeds at the monitoring portions of the rotation members;
determine whether or not the calculated maximum speed is equal to or lower than a reference speed;
instruct the angular speeds of all the servo motors, based on a ratio between the maximum speed and the reference speed, such that all the calculated speeds at the monitoring portions are reduced to be equal to or less than the reference speed when it is determined that the calculated maximum speed is over the reference speed; and
drive the servo motors at the instructed reduced angular speeds.

2. The apparatus of claim 1, wherein the controller is configured to, through the execution of the processing unit, calculate an angle of each of the servo motors every operation cycle,
wherein the speed of the monitoring portion of each of the rotation members is calculated, based on the current angle of each of the servo motors, an angle, which is provided at a time when the current operation cycle elapses, of each of the servo motors currently calculated, and a size of each of the rotation members.

3. The apparatus of claim 2, wherein the controller is configured to calculate the speed of the monitoring portion by:
calculating a current position of each of the monitoring portions based on the current angle of each of the servo motors and the size of each of the rotation members,
calculating the position of each of the monitoring portions at a time when the current operation cycle elapses, based on the angle, which is provided at a time when the current operation cycle elapses, of each of the servo motors calculated and the size of each of the rotation members, and
calculating the speed by dividing a distance between the current position of each of the monitoring portions and a position thereof at a time when the current operation cycle elapses, by the operation cycle.

4. The apparatus of claim 3, wherein the monitoring portions include a monitoring portion which is set at a part of a designated rotation member, the designated rotation member being at least one among the rotation members and being rotated, the monitoring portion set at the part of the designated rotation member being the farthest from the joint on which the designated rotation member rotates.

5. The apparatus of claim 4, wherein the controller is configured to instruct the reduction in the angular speeds of the servo motors, by dividing the calculated angular speeds of the servo motors by the ratio.

6. The apparatus of claim 4, wherein the controller is configured to, through the execution of the processing unit:
calculate a virtual angle of each of the servo motors every virtual operation cycle; and
calculate a virtual speed of the monitoring portion of each of the rotation members, based on the current angle of each of the servo motors, the virtual angle, which is provided when the current virtual operation cycle elapses, of each of the servo motors, which is calculated, and a size of each of the rotation members,
wherein the controller is configured to:
determine whether or not a maximum speed among the virtual speeds at the monitoring portions is equal to or lower than the reference speed,
shorten the virtual operation cycle by dividing the virtual operation cycle by the ratio when it is determined that the maximum speed is larger than the reference speed, and instruct the servo motors to be driven, every operation cycle, up to the calculated virtual angles when it is determined that the maximum speed is less than the reference speed.

7. The apparatus of claim 6, wherein the controller is configured to, through the execution of the processing unit, prohibit from driving the servo motors when repeating shortening the virtual operation cycle more than a predetermined number of times.

8. The apparatus of claim 4, wherein the controller is configured to, through the execution of the processing unit, calculate an angle of each of the servo motors every operation cycle,
wherein the controller is configured to:
determine whether or not a maximum speed among the speeds at the monitoring portions is equal to or lower than the reference speed, and
instruct the angular speeds of the servo motors such that the operation cycle is extended by multiplying the operation cycle by the ratio and the servo motors are instructed to be driven, every extended operation cycle, up to the calculated angles, when it is determined that the maximum speed is larger than the reference speed.

9. The apparatus of claim 2, wherein the monitoring portions include a monitoring portion which is set at a part of a designated rotation member, the designated rotation member being at least one among the rotation members and being rotated, the monitoring portion set at the part of the designated rotation member being the farthest from the joint on which the designated rotation member rotates.

10. The apparatus of claim 9, wherein the controller is configured to instruct the reduction in the angular speeds of the servo motors, by dividing the calculated maximum angular speed of the servo motors by the ratio.

11. The apparatus of claim 10, wherein the controller is configured to, through the execution of the processing unit:
calculate a virtual angle of each of the servo motors every virtual operation cycle; and
calculate a virtual speed of the monitoring portion of each of the rotation members, based on the current angle of each of the servo motors, the virtual angle, which is provided when the current virtual operation cycle elapses, of each of the servo motors, which is calculated, and a size of each of the rotation members,
wherein the controller is configured to:
determine whether or not a maximum speed among the virtual speeds at the monitoring portions is equal to or lower than the reference speed,
shorten the virtual operation cycle by dividing the virtual operation cycle by the ratio when it is determined that the maximum speed is larger than the reference speed, and
instruct the servo motors to be driven, every operation cycle, up to the calculated virtual angles when it is determined that the maximum speed is less than the reference speed.

12. The apparatus of claim 1, wherein the monitoring portions include a monitoring portion which is set at a part of a designated rotation member, the designated rotation member being at least one among the rotation members and being rotated, the monitoring portion set at the part of the designated rotation member being the farthest from the joint on which the designated rotation member rotates.

13. The apparatus of claim 12, wherein the controller is configured to, through the execution of the processing unit, instruct the reduction in the angular speeds of the servo motors, by dividing the calculated maximum angular speed of the servo motors by the ratio.

14. The apparatus of claim 13, wherein the controller is configured to, through the execution of the processing unit:
calculate a virtual angle of each of the servo motors every virtual operation cycle; and
calculate a virtual speed of the monitoring portion of each of the rotation members, based on the current angle of each of the servo motors, the virtual angle, which is provided when the current virtual operation cycle elapses, of each of the servo motors, which is calculated, and a size of each of the rotation members,
wherein the controller is configured to:
determine whether or not a maximum speed among the virtual speeds at the monitoring portions is equal to or lower than the reference speed, and
shorten the virtual operation cycle by dividing the virtual operation cycle by the ratio when it is determined that the maximum speed is larger than the reference speed, and instructs the servo motors to be driven, every operation cycle, up to the calculated virtual angles when it is determined that the maximum speed is less than the reference speed.

15. The apparatus of claim 14, wherein the controller is configured to, through the execution of the processing unit, prohibit from driving the servo motors when repeating shortening the virtual operation cycle more than a predetermined number of times.

16. A method of controlling motions of a robot, the method being performed by a controller, the method comprising:
calculating, every operation cycle, an angular speed at which to drive each of a plurality of electric servo motors of the robot, the robot having an arm, the arm including a plurality of rotation members, a plurality of joints each rotatably and mutually connecting two mutually-adjacent rotation members of the rotation members, and the plurality of electric servo motors respectively driving the joints to rotate the rotation members;
calculating a speed of each of monitoring portions previously designated in or on the rotation members, respectively;
calculating a maximum speed among the speeds at the monitoring portions of the rotation members;
determining whether or not the calculated maximum speed is equal to or lower than a reference speed;
instructing the angular speeds of all the servo motors, based on a ratio between the maximum speed and the reference speed, such that all the calculated speeds at the monitoring portions are reduced to be equal to or less than the reference speed when it is determined that the calculated maximum speed is over the reference speed; and
driving the servo motors at the instructed reduced angular speeds.

17. The method of claim 16, further comprising calculating an angle of each of the servo motors every operation cycle,
wherein the speed of the monitoring portion of each of the rotation members is calculated, based on the current angle of each of the servo motors, an angle, which is provided at a time when the current operation cycle elapses, of each of the servo motors currently calculated, and a size of each of the rotation members.

* * * * *